(12) United States Patent
Alsop et al.

(10) Patent No.: US 8,720,546 B2
(45) Date of Patent: May 13, 2014

(54) PREVENTION OF BIOMASS AGGREGATION AT INJECTION WELLS

(75) Inventors: Albert W. Alsop, Wilmington, DE (US); Sheryl M. Anyzek, Elkton, MD (US); Robert D. Fallon, Elkton, MD (US); Edwin R. Hendrickson, Hockessin, DE (US); Sharon Jo Keeler, Bear, DE (US); Abigail K. Luckring, West Chester, PA (US); Michael P. Perry, Downingtown, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 314 days.

(21) Appl. No.: 13/280,760

(22) Filed: Oct. 25, 2011

(65) Prior Publication Data

US 2012/0273189 A1 Nov. 1, 2012

Related U.S. Application Data

(60) Provisional application No. 61/408,731, filed on Nov. 1, 2010.

(51) Int. Cl.
*E21B 43/22* (2006.01)
*C09K 8/582* (2006.01)

(52) U.S. Cl.
USPC ........ 166/246; 166/263; 166/270; 166/305.1; 166/400; 435/253.3; 435/262.5; 435/281; 507/201

(58) Field of Classification Search
None
See application file for complete search history.

(56) References Cited

U.S. PATENT DOCUMENTS

| 4,799,545 | A | | 1/1989 | Silver et al. |
|---|---|---|---|---|
| 4,905,761 | A | * | 3/1990 | Bryant ........................ 166/246 |
| 4,947,923 | A | | 8/1990 | Rikker |
| 5,083,611 | A | * | 1/1992 | Clark et al. .................. 166/246 |
| 5,327,967 | A | | 7/1994 | Jenneman et al. |
| 5,360,064 | A | * | 11/1994 | Jenneman et al. ............ 166/246 |
| 5,363,913 | A | * | 11/1994 | Jenneman et al. ............ 166/246 |
| 5,368,099 | A | * | 11/1994 | Davey et al. .................. 166/246 |
| 5,531,895 | A | * | 7/1996 | Alford et al. .................. 210/610 |
| 6,758,270 | B1 | | 7/2004 | Sunde et al. |
| 8,357,526 | B2 | * | 1/2013 | Keeler et al. ............... 435/253.3 |
| 2009/0029879 | A1 | * | 1/2009 | Soni et al. ..................... 507/201 |
| 2009/0263887 | A1 | | 10/2009 | Keller et al. |
| 2010/0081585 | A1 | | 4/2010 | Fallon |
| 2011/0244554 | A1 | | 10/2011 | Alsop |

FOREIGN PATENT DOCUMENTS

WO 2009017810 A1 2/2009

OTHER PUBLICATIONS

Ramkrishna, Biotechnology in petroleum recovery: The microbial EOR, Prog. Energy Com. Sci., vol. 34, 2008, pp. 714-724.
U.S. Appl. No. 61/408,734, filed Nov. 1, 2010, inventors Robert D. Fallon et al.
International Search Report, PCT/US2001/058754, Mail date May 10, 2012.

* cited by examiner

*Primary Examiner* — George Suchfield

(57) ABSTRACT

Disclosed herein is introduction of different nutrient solution formulations to a subterranean target site to prevent biofilm formation and biomass aggregation at the sand face of an injection well bore during MEOR or bioremediation processes. A first nutrient solution formulation supports growth of introduced microorganisms and a second nutrient solution formulation is used to promote biofilm formation to allow plugging of pores and channels in the subterranean target site, for MEOR or bioremediation.

15 Claims, 1 Drawing Sheet

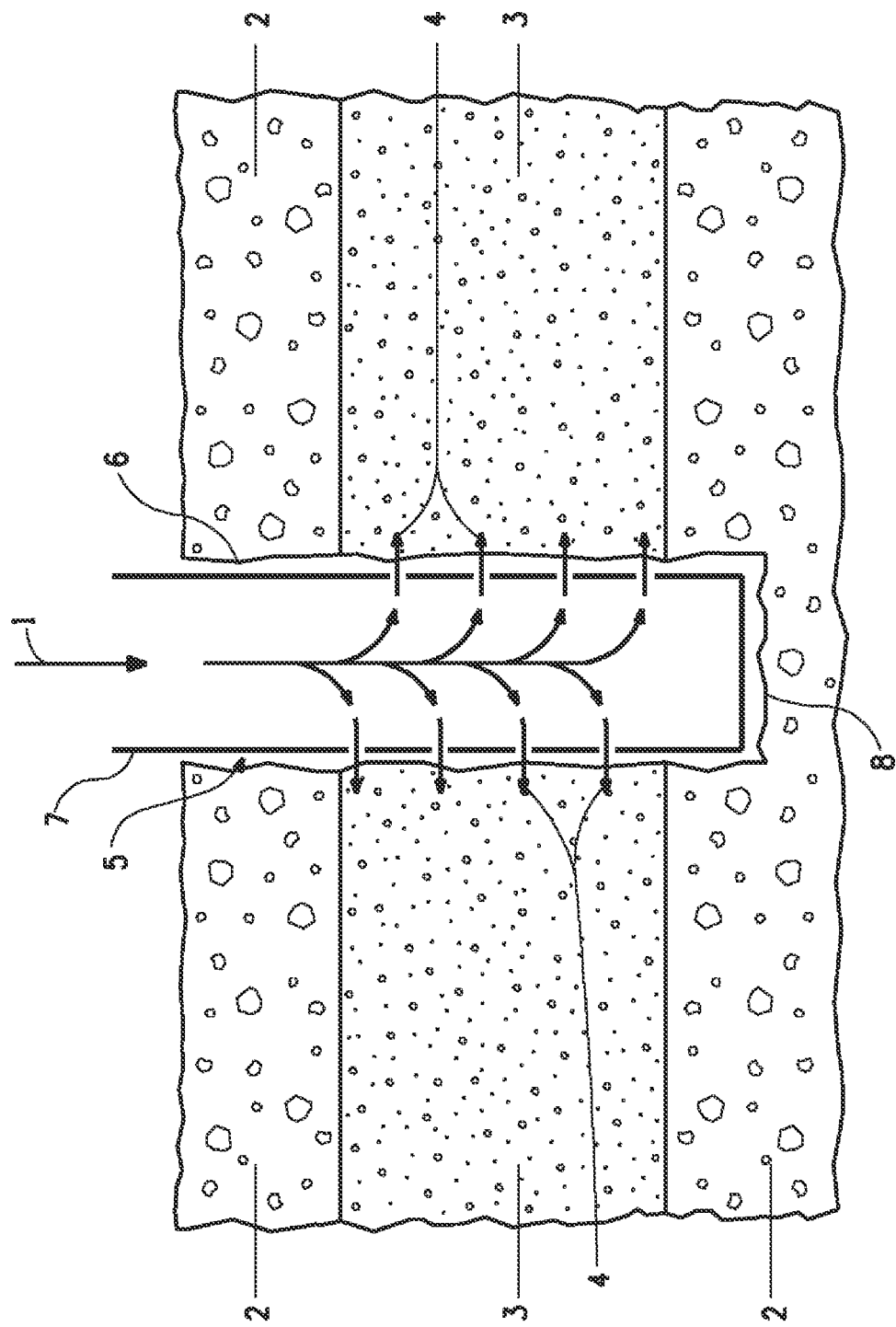

PREVENTION OF BIOMASS AGGREGATION AT INJECTION WELLS

This application claims the benefit of U.S. Provisional Application 61/408,731, filed Nov. 1, 2010, and is incorporated by reference in its entirety.

FIELD OF INVENTION

This disclosure relates to the field of environmental microbiology. Specifically, it relates to the field of microbial enhanced oil recovery and bioremediation. More specifically it relates to prevention of microbial aggregation and biofilm formation at the injection well bore during microbial enhanced oil recovery or bioremediation.

BACKGROUND OF THE INVENTION

During recovery of oil from oil reservoirs, typically only minor portions of the original oil in the oil-bearing subterranean strata is recovered by primary recovery methods which use only the natural forces present in the oil reservoir. Secondary oil recovery methods such as water flooding, that is, the injection of water through injection wells into the oil reservoir, have been used to force oil through the subterranean strata toward production wells and thus improve oil recovery (Hyne, N. J., 2001, "Non-technical guide to petroleum geology, exploration, drilling, and production", 2nd edition, Pen Well Corp., Tulsa, Okla., USA). One problem commonly encountered with water flooding operations is that the heterogeneity of the subterranean strata can lead to reduced sweep efficiency during water flooding. In other words, water preferentially channels through the more porous strata of the oil reservoir as it travels from the injection well to the production wells and creates watered-out strata, and bypasses other subterranean oil-bearing subterranean strata that are not watered-out, thereby reducing the efficiency of oil recovery from the strata that is not watered-out.

It is known to use Microbial Enhanced Oil Recovery (MEOR) to assist oil recovery (Brown, L. R., Vadie, A. A., Stephen, O. J. SPE 59306, SPE/DOE Improved Oil Recovery Symposium, Oklahoma, 3-5—Apr., 2000). Viable microorganisms can be injected into an oil reservoir where they can adhere to the surfaces of pores and channels in the rock or sand matrices in the watered-out zones and plug them to prevent water channeling towards watered-out zones during water flooding, which targets the water flow towards a larger area of the oil-bearing subterranean strata that has not been watered-out (Ramkrishna, S., Prog. Energy Com. Sci., 34: 714-724, 2008).

One of the problems associated with MEOR is premature activity of exogenously introduced microorganisms, or native microorganisms, as soon as nutrient solutions are added to an injection well which results in premature bioplug formation and blocking of the pores close to the injection well bore. In this situation components introduced into the injection well cannot move into the oil-bearing subterranean strata to promote MEOR.

WO2009017810A1 describes a method of enhanced oil recovery from an oil-bearing rock formation. The method involves introducing a consortium of microorganisms and a nutrient solution into an injection well. The consortium is maintained for an amount of time sufficient for the growth and colonization of the microbes in the reservoir to displace oil.

The commonly owned and co-pending U.S. Patent Application Publication US 20100081585A1, which is herein incorporated by reference in its entirety, describes controlling activation of microorganisms in MEOR and bioremediation processes and relies on formulations that are inhibitory, at applied concentrations, to both native and introduced microbes when applied to the site. These formulations prevent microbial growth and activation until the inhibitory agent has dissipated.

U.S. Pat. No. 4,947,923 discloses a process for MEOR comprising injecting bacteria into a well bore and injecting a nutrient source to cause bacteria to grow and selectively plug the formation. The nutrient used is capable of flowing downhole and providing a nutrient source of phosphate, e.g., tripolyphosphate, without precipitation on contact with connate water.

For successful MEOR and bioremediation operations, prevention of premature bioplug formation and blocking of the pores close to the injection well bore remains a problem to be solved.

SUMMARY OF THE INVENTION

In one aspect, the present invention is a method for treatment of a subterranean target site, comprising the steps of, in order:

a) preparing a biomass suspension comprising one or more species of microorganisms;

b) introducing the suspension of (a) into an injection well bore of the subterranean target site;

c) optionally introducing one or more fluids into the injection well bore;

d) introducing a first nutrient solution formulation into the injection well bore wherein said first nutrient solution supports growth of one or more microorganisms of (a) at said subterranean target site but does not promote biomass aggregation and biofilm production; and e) introducing a second nutrient solution formulation into the injection well bore wherein said second nutrient solution formulation promotes bioplugging of pores and channels in the subterranean target site.

In another aspect of the invention is a method for treatment of a subterranean target site, comprising the steps of, in order:

a) preparing a biomass suspension comprising one or more strains of *Pseudomonas stutzeri;* b) introducing the suspension of (a) into the injection well bore of the subterranean target site;

c) introducing one or more fluids into said injection well bore;

d) introducing a first nutrient solution formulation into the injection well bore wherein said first nutrient solution comprises lactate and no acetate, wherein the lactate promotes growth of the *Pseudomonas stutzeri* and maintains the *Pseudomonas stutzeri* in suspension; and e) introducing a second nutrient solution formulation into the injection well bore wherein said second nutrient solution comprises acetate, and wherein the acetate promotes bioplug formation by the *Pseudomonas stutzeri* strain of (a).

BRIEF DESCRIPTION OF FIGURES OF THE INVENTION

FIG. 1 is a schematic of a well bore and the subterranean sites adjacent to it. All numbers below in bold refer to FIG. 1. (1) is the flow of injection water into the well casing (7), (2 and 3) are rock layers, (4) is the perforations in the casing, (5) is the well bore, (6) is the sand face of the injection well bore, (8) is the bottom of the well bore in rock layer (2).

Applicants made the following biological deposit under the terms of the Budapest Treaty on the International Recognition of the Deposit of Microorganisms for the Purposes of Patent Procedure:
Information on Deposited Strain

| Depositor Identification Reference | International Depository Designation | Date of Deposit |
|---|---|---|
| *Pseudomonas stutzeri* BR5311 | ATCC No. PTA-11283 | Sep. 9, 2010 |
| *Pseudomonas stutzeri* LH4:15 | ATCC No. PTA-8823 | Dec. 4, 2007 |
| *Pseudomonas stutzeri* 89AC1-3 | ATCC No. PTA-11284 | Sep. 9, 2010 |
| *Arcobacter* sp 97AE3-3 | ATCC No. PTA-11410 | Oct. 14, 2010 |
| *Arcobacter* sp 97AE3-12 | ATCC No. PTA-11409 | Oct. 14, 2010 |

DETAILED DESCRIPTION OF THE INVENTION

Applicants specifically incorporate the entire content of all cited references in this disclosure. Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The following definitions are provided for the special terms and abbreviations used in this application:

The abbreviation "ATCC" refers to American Type Culture Collection International Depository, Manassas, Va., USA. "ATCC No." refers to the accession number to cultures on deposit with ATCC.

The term "biofilm" means a film or "biomass layer" of microorganisms. Biofilms are often embedded in extracellular polymers, which adhere to surfaces submerged in, or subjected to, aquatic environments. Biofilms consist of a matrix of a compact mass of microorganisms with structural heterogeneity, which may have genetic diversity, complex community interactions, and an extracellular matrix of polymeric substances.

The term "plugging biofilm" or "bioplug" means a biofilm that is able to alter the permeability of a porous material, and thus retard the movement of a fluid through a porous material that is associated with the biofilm or bioplug.

The invention relates to a method for prevention of plugging of the sand face of an injection well bore, and pores close to the injection well bore, during MEOR or bioremediation applications by introducing fluids and selected nutrient formulations. In the disclosed method, following microbial biomass suspension introduction into an injection well, optionally fluid is added to move the biomass away from the introduction site. This is then followed by introducing a first nutrient solution formulation to the injection well that provides nutrients for growth of microorganisms in the subterranean target site without promoting biomass aggregation and biofilm formation. This is followed by introducing a second nutrient solution formulation that promotes adhering of microorganisms to pores and channels in the subterranean target site, and production of biofilms for bioplug formation.

In one embodiment the microbial biomass suspension is prepared in the first nutrient solution formulation, and this suspension preparation is introduced into the injection well bore. When using the biomass suspension prepared in the first nutrient solution, additional first nutrient solution formulation may be introduced following optional fluid introduction, or this step may be omitted.

The "injection well bore sand face" faces the rock layers (FIG. 1: 2, 3) of the subterranean strata that are in communication with the injection well through perforations in the well casing (FIG. 1: 4). The current method alters the subterranean target site's permeability and thus assists in oil recovery or bioremediation. The phrase "subterranean target site", as used herein, refers to zones below the earth surface made up of sand stone, unconsolidated sand, or limestone wherein MEOR or bioremediation is applied. The phrase "altering the target site permeability" as used herein refers to processes that result in plugging the watered-out zones, and thus redirecting the flow of water flood towards zones that have not been watered-out. These processes include biofilm formation and plugging of the pores of the sand and rocks in the subterranean target site by microorganisms.

In additional embodiments, additional steps may be included in the method. For example in one embodiment, following step (d), the injection well is shut-in for a period of time. During this time the well is closed off so that nothing is introduced into the well, and the microorganisms will grow in their new environment. In another embodiment, following step (d) one or more fluids are introduced into the injection well bore. This fluid is used to move the microorganisms further into the subterranean target site. In another embodiment the injection well is shut-in for a period of time after introducing one or more fluids following step (d). In another embodiment, following step (e), one or more fluids is introduced into the injection well bore. The fluid floods move through unblocked pores and channels removing oil for oil recovery, or other substances for bioremediation. In another embodiment, additional second nutrient solution formulation is introduced into the injection well bore after step (e) to promote further biofilm formation. The additional second nutrient solution formulation is typically added periodically in batches between introducing the fluids. Any combination of these further steps may be used in the present method.

A schematic of an injection well bore and the subterranean site adjacent to it is depicted in FIG. 1. When a fluid (1) is introduced into the injection well, it flows into the well casing (7) which is inside the well bore (5) drilled through rock layers (2, 3). A gap exists between the well casing (7) and the injection well bore sand face (6) of the rock layer made by the well bore (5). Rock layer (2) represents impermeable rock above and below a permeable rock layer (3) that holds or traps oil. Any fluid (1) introduced into the well bore flows down the well casing (7) and passes through perforations in the casing (5) and into perforations (4) in the rock matrix of the oil-bearing subterranean strata (3). This fluid then flows through the oil-bearing subterranean strata (3) and displaces oil from these strata. This zone extends radially out from the well bore (5) in all directions in the oil-bearing strata (3).

In the present method, when microbial biomass is introduced into an injection well bore, it is optionally followed by addition of one or more fluids to assist moving the microorganisms into the adjacent subterranean target site. Fluids suitable for use herein can include, for example, injection and production waters used during MEOR operations. A fluid useful in the current method comprises water. Water can be supplied from any suitable source, and can include, for example: sea water, brine, production water, water recovered from an underground aquifer, including those aquifers in contact with the oil in a subterranean site, or surface water from a stream, river, pond or lake. As is known in the art, it may be necessary to remove particulate matters including dust, bits of rock or sand and corrosion by-products such as rust from the water prior to injection into the one or more well bores. Methods to remove such particulate matters, e.g., filtration, sedimentation and centrifugation, are well known in the art.

In an embodiment of the disclosed method, injection or production waters from oil reservoirs are introduced into an injection well bore following introduction of a microbial biomass suspension to move the microorganisms introduced into the injection well further into the adjacent subterranean target site.

The injection water or production water from such wells can contain various concentrations of mixed salts containing for example chloride, sodium, potassium, bromine, magnesium, barium and calcium (hereafter "salt"). The salinity of the injection or production well water can be from about 0 to about 100 parts per thousand (ppt).

Even when a well-dispersed biomass suspension is prepared, it can aggregate and cause plugging of the sand face of the injection well bore after its introduction into the well bore, thus reducing the amount of biomass that reaches the subterranean target site where oil recovery or bioremediation is to take place or increasing the pressure needed to pump fluid into the well bore in the worse case effectively plugging off the well bore. The present method reduces microbial biomass aggregation and biofilm and bioplug formation at the sand face of the injection well bore by introducing fluids and nutrient solution formulations disclosed herein which allow deeper penetration of the biomass into the subterranean target site.

Nutrient Solution Formulation

Nutrient solution formulations useful in the present invention may include growth substrates (compounds that supply mass and energy for cell growth); electron acceptors; nitrogen and phosphorus sources, as well as various trace elements such as vitamins and metals that are usually required for microbial growth and activity in addition to the growth substrate and nitrogen sources.

Nutrient solution formulations useful in the present invention comprise the following substances, alone or in combination: carbon sources, added at greater than 0.01% w/v; an electron acceptor for microbial growth (for anaerobic growth conditions), added at greater than 0.01% w/v; a source of nitrogen, added at greater than 0.001% w/v; a source of phosphorous, added at greater than 0.001% w/v; a source of trace nutrients, such as vitamins and metals, added at greater than 0.0001% w/v.

Useful nutrient solution formulations contemplated herein include those containing at least one of the following elements: C, H, O, P, N, S, Mg, Fe, or Ca. Non-limiting examples of useful inorganic radicals comprising at least one of the above elements include, for example: $PO_4^{2-}$, $NH_4^+$, $NO_2^-$, $NO_3^-$, and $SO_4^{2-}$. Growth substrates can include sugars, organic acids, alcohols, proteins, polysaccharides, fats, hydrocarbons or other organic materials known in the art of microbiology to be subject to microbial decomposition. Major nutrients containing nitrogen and phosphorus (non-limiting examples can include $NaNO_3$, $KNO_3$, $NH_4NO_3$, $Na_2HPO_4$, $K_2HPO_4$, $NH_4Cl$); vitamins (non-limiting examples may include folic acid, ascorbic acid, and riboflavin); trace elements (non-limiting examples may include B, Zn, Cu, Co, Mg, Mn, Fe, Mo, W, Ni, and Se); buffers for environmental controls; catalysts, including enzymes; and both natural and artificial electron acceptors (non-limiting examples may include $SO_4^{2-}$, $NO_3^-$, $Fe^{+3}$, humic acid, mineral oxides, quinone compounds, $CO_2$, $O_2$, and combinations thereof) may be included. Complex ingredients such as yeast extract may be used to provide multiple nutrients such as vitamins and amino acids.

In the current method, separate nutrient solution formulations having different effects on one or more introduced microorganism are used during treatment of a subterranean target site. The nutrient solution formulations are introduced into the injection well bore in a subterranean target site following introduction of a biomass suspension and optionally one or more fluids. The first nutrient solution provides nutrients that support growth of one or more introduced microorganism, but it does not promote biomass aggregation and biofilm formation. With the first nutrient solution formulation there may be some biofilm formation, but it is reduced in comparison to the amount of biofilm formation produced by the microorganism(s) in the presence of the second nutrient solution formulation. Thus biofilm formation is not promoted by the first nutrient solution formulation. The first nutrient solution may also maintain the microorganisms in suspension, rather than promoting aggregation. Thus with introduction of the first nutrient solution, introduced microorganisms can spread and grow throughout the subterranean target site without blocking the sand face of the injection well bore, and pores close to the well bore.

The second nutrient solution, which is introduced after the first nutrient solution, promotes effects in microorganisms that lead to bioplugging of pores and channels in the subterranean target site. The effects may include aggregation, adhesion, and biofilm production. Thus with introduction of the second nutrient solution, pores and channels in the subterranean target site are blocked leading to improved oil recovery or bioremediation.

Differences in the composition of the first and second nutrient solution formulations may be in any component or components that promote the differing effects described above. For example, there may be differences in growth substrates. In an embodiment of the present method, the first nutrient solution formulation introduced following introduction of the biomass suspension, and optionally at least one fluid, contains lactate and does not contain acetate. Lactate concentration in the first nutrient solution formulation is from 25 parts per million to about 10,000 parts per million. This is followed by introduction of the second nutrient solution formulation which contains acetate. The acetate concentration in the second nutrient solution formulation can be up to 30 weight percent. The first and second nutrient solution formulations comprise nitrate up to 30 weight percent.

Effects of different nutrient solution formulations on different microorganisms may also vary in the presence of different salt concentrations. For example, a greater differential in biofilm formation may occur between nutrient solution formulations containing lactate or acetate in the presence of high salt as compared to low salt. High salt concentration may be at least about 30 ppt, 35 ppt, 40 ppt, 45 ppt, 50 ppt, 55 ppt, 60 ppt, 65 ppt, 70 ppt, or 75 ppt, or higher.

In the current method, following introduction of a biomass suspension containing microorganisms the combination of the first and second nutrient solutions with lactate and acetate, respectively, can be used with any microorganisms that have increased bioplugging in acetate containing medium as opposed to in lactate containing medium.

Microorganisms can be identified as having different properties in different nutrient solution formulations by testing in biofilm assays as described in General Methods herein. For example *Pseudomonas stutzeri* strains BR5311 (ATCC No. PTA-11283) and LH4:15 (ATCC No. PTA-8823) were shown herein to form more effective bioplugs in acetate containing nutrient solution than in lactate containing nutrient solution. Bioplug response may vary with salinity of the nutrient solution used and can be readily assessed by one skilled in the art using assays described herein.

In another embodiment, other microorganisms may be used for plugging that may require other specific nutrients for biofilm formation and plugging. The compositions needed for the first and second nutrient solutions can be readily determined by one skilled in the art based on plugging responses of the microorganism(s) to be introduced in the biomass suspension using assays described under General Methods herein.

Biomass

The biomass suspension useful for the method disclosed herein, to form biofilms and plug pores of the subterranean target site, can comprise classes of facultative anaerobes, obligate anaerobes and denitrifiers. Various species of microorganisms (bacteria and fungi) used for biofilm formation and aggregation to improve sweep efficiency and enhance oil recovery may include, but are not limited to, the genera: *Pseudomonas, Bacillus, Actinomycetes, Acinetobacter, Arthrobacter, Schizomycetes, Corynebacteria, Achromobacteria, Arcobacter, Enterobacteria, Nocardia, Saccharomycetes, Schizosaccharomyces, Vibrio, Shewanella, Thauera, Petrotoga, Microbulbifer, Marinobacteria, Fusibacteria*, and *Rhodotorula*. The terms "genus" and "genera", as used herein, refer to the category of microorganisms ranking below a "family" and above a species in the hierarchy of taxonomic classification of microorganisms. "Species", as used herein, refers to a group of microorganisms that share a high degree of phenotypic, biochemical and genotypic similarities.

The biomass suspension can comprise only one particular species, two or more species of the same genera, a combination of different genera, or a combination of multiple species of multiple genera of microorganisms. In one embodiment the biomass suspension for the practice of the current method is obtained using *Pseudomonas stutzeri* LH4:15 (ATCC NO: PTA-8823) described in commonly owned and co-pending U.S. Patent Application Publication No: 20090263887, the contents of which is herein incorporated on its entirety by reference. In another embodiment the biomass suspension for the practice of the current method is obtained using *Pseudomonas stutzeri* strain BR5311 (ATCC # PTA-11283), which is disclosed in commonly owned and co-pending U.S. Patent Application No. 61/408,734, which is incorporated herein by reference. In yet another embodiment the biomass suspension contains both of these strains.

The biomass suspension, fluids, and nutrient solutions can be introduced into the well bore by various means such as a centrifugal pump, a piston pump, gear pump or any other device or by any other method well known in the art.

Biomass Preparation

The biomass suspension useful for the current method is prepared by growing the one or more microorganism of choice in an appropriate medium. One skilled in the art would be familiar with suitable media that can be used for biomass preparation of the desired microorganisms. When *Pseudomonas stutzeri* is used, the suitable medium can contain lactate that will not support bioplug formation. The biomass may be concentrated such as by filtration or centrifugation. The biomass can be prepared as required for immediate introduction into the injection well without storage. Alternatively, the biomass can be prepared ahead of time and can be stored frozen as a paste. Biomass preparation from a frozen biomass requires special attention and probably application of one or more type of mixers to insure complete resuspension of biomass and absence of any cell aggregates. For example, a method for delivering a biomass population including flowing through a biomass dispersing device is disclosed in US Patent Application Publication 20110244554, which is incorporated herein by reference.

The disclosed method can also be used for bioremediation of contaminated sites.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the scope thereof, can make various changes and modifications of the invention to adapt it to various usages and conditions.

General Methods

Growth of Biomass

Techniques for growth and maintenance of anaerobic microorganisms are well known in the art. Anaerobic growth is measured by nitrate depletion from the growth nutrient solution over time and accumulation of nitrite.

Biomass can be grown and stored as described in the co-pending U.S. Patent Application Publication No: 20090263887 the contents of which is herein incorporated on its entirety by reference.

PPGAS medium contained: 20 millimolar (mM) $NH_4Cl$, 20 mM KCl, 120 mM Tris-Cl, 1.6 mM $MgSO_4$, 1% peptone, 0.5% glucose, pH 7.5. The composition of the minimal salts nutrient solution formulation used in examples below is shown in Table 1.

TABLE 1

| Composition of the minimal salts nutrient solution formulation | |
|---|---|
| g/L | Chemical |
| 1.0 | $NH_4Cl$ |
| 0.5 | $KH_2PO_4$ |
| 0.4 | $MgCl_2 \cdot 6H_2O$ |
| 0.2 | $CaCL_2 \cdot 2H_2O$ |
| 10 | NaCl |
| 0.69 | $NaH2PO4$ |
| 2.5 | $NaHCO_3$ |
| 0.073 | $KSO_4$ |
| 1000X g/L | Trace elements |
| 1.5 | $FeCl_2 \cdot 4H_2O$ |
| 0.002 | $CuCl_2 \cdot 2H_2O$ |
| 0.1 | $MnCL_2 \cdot 4H_2O$ |
| 0.19 | $CoCl_2 \cdot 6H_2O$ |
| 0.07 | $ZnCl_2$ |
| 0.006 | $H_3BO_3$ |
| 0.036 | $Na_2MoO_4 \cdot 2H_2O$ |
| 0.024 | $NiCl_2 \cdot 6H_2O$ |
| 0.277 | HCl |

TABLE 1-continued

Composition of the minimal salts nutrient solution formulation

| 1000X g/L | Selenium/tungstate |
|---|---|
| 0.006 | $Na_2SeO_3 \cdot 5H_2O$ |
| 0.008 | $Na_2WO_4 \cdot 2H_2O$ |
| 0.5 | NaOH |
| 1000X mg/L | Vitamin mix |
| 100 | vitamin B12 |
| 80 | p-aminobenzoic acid |
| 20 | D(+)-Biotin |
| 200 | nicotinic acid |
| 100 | calcium pantothenate |
| 300 | pyridoxine hydrochloride |
| 200 | thiamine-HCL$\cdot 2H_2O$ |
| 50 | Alpha-lipoic acid |

The pH of the medium was adjusted to 7.3.

Purchased Nutrient Solution Formulation

Millers LB growth medium was purchased (MediTech, Inc, Manassas, Va.).

Injection Water Samples

Injection water was sampled from two separate fields each located in two different petroleum production fields. Well #1 is located in the Senlac field on the border of Saskatchewan and Alberta provinces, Canada. This well has a salinity between 30-35 parts per thousand (ppt) in both production and injection waters. Well #2 is in the Wainwright field in the province of Alberta, Canada. This well has a salinity of about twice seawater, which is in the range of 65 ppt.

Samples from Oil Reservoir Production and Injection Waters.

Water samples were obtained from production and injection wells (well #1 and well #2) as mixed oil/water liquids in glass 1.0 liter (L) brown bottles, filled to the top, capped and sealed with tape to prevent gas leakage. Gas produced during inherent anaerobic processes sufficed to maintain anaerobic conditions during shipment. The bottles were shipped in large plastic coolers filled with ice blocks to the testing facilities within 48 hours of sampling.

Measurement of Total Dissolved Salts (Salinity)

The total dissolved salt was measured using a hand-held refractometer (Model RHS 10ATC, Huake Instrument Co., Ltd, Shenzhen, China).

Biofilm Formation on Sintered Glass Filters

An assay to evaluate microorganisms for their ability to form biofilms on silica surfaces and prevent water flow through ~10 micron pore spaces (plugging) was developed using sintered glass filters. 25 millimeter (mm) medium coarseness sintered glass filters (stock #15254, Adams and Chittenden Scientific Glass, Berkeley Calif.) were glued into the base of plastic holders designed for membrane filtration. After curing, the filter assemblies were sterilized by autoclaving. Individual filters, in holders, were placed in sterile petri plates and nutrient solution formulation, which contained inoculum from overnight cultures of various strains, was added on top of the glass filters. Nutrient solution formulation in this biofilm formation/plugging assay was either a minimal salts medium (Table 1) or injection or production water samples, supplemented with nitrogen, phosphate, trace elements, vitamins, carbon source and nitrate as electron acceptor. The Petri plates were covered and incubated at room temperature under anaerobic conditions for one to 2 weeks. The filters were then removed from the nutrient solution formulation and the top piece of the plastic holder was tightened in place. A ten centimeter length of tubing was attached to the inlet port of the filter holder and was filled with water. The time (in seconds) to drain the water in the tube was measured. Control filters without any microorganisms took around 10 seconds to drain. Filters that took longer than 10 seconds to drain were considered "plugged".

In an alternate plugging assay, the sintered glass filters were infiltrated with fluid before use, prescreened for flow rate before addition of microorganisms, and the percent change in the flow rate post incubation was determined at the end of the experiment.

Example 1

Ability of *Pseudomonas Stutzeri* (LH4:15) to Form Biofilms on Silica Surfaces

To assess the ability of *Pseudomonas stutzeri* strain LH4: 15 (ATCC # PTA-8823) to produce stable biofilms on silica surfaces, sterile glass beads (3 mm, #11-312A, Fisher Scientific, Hampton, N.H.) were placed into the wells of a 24-well microtiterplate (#353047, BD Biosciences) and an aliquot (1.0 mL) of injection water or the PPGAS medium was added. Then either 0.6% acetate or 0.6% lactate was added to each well followed by 10 µl of an overnight culture of strain LH4: 15 that had grown aerobically in PPGAS medium while shaking at 200 revolutions per minute (rpm) and at room temperature. The plates were then incubated at room temperature for up to one week. Biofilm formation was assessed by visual inspection.

Results indicated that different types of biofilms were formed on the glass beads. In the wells containing the injection water, most of the biofilm was formed on the glass beads while only small amounts of biofilm was observed on the sides and bottom of the well. However, when PPGAS medium was used as the nutrient solution formulation, biofilm was formed throughout the entire well. In wells that contained acetate as the additional carbon source, the biofilm formed was more granular whereas in wells containing lactate, the biofilm formed was smoother. These results indicated that *Pseudomonas stutzeri* strain LH4:15 had the ability to readily form biofilms on silica surfaces and to produce different types of biofilms depending on the available carbon source.

Example 2

Effect of Carbon Source on the Ability of *Pseudomonas Stutzeri* Strain BR5311 to Form Biofilms The effect of the carbon source in the nutrient solution formulation on biofilm formation by *Pseudomonas stutzeri* strain BR5311 (ATCC #PTA-11283) was examined in this example. Strain BR5311 was isolated as a microorganism capable of growth at water/oil interfaces under denitrifying conditions from injection water of Well #1 that is located in the Senlac field on the border of Saskatchewan and Alberta provinces in central Canada. It was identified as a strain of *Pseudomonas stutzeri* by 16S rDNA analysis, which is described in commonly owned and co-pending U.S. Patent Application No. 61/408,734.

The biofilm formation assay was performed as described in General Methods. The medium used was the minimal salts medium indicated in Table 1 and was supplemented with acetate or lactate as the sole carbon source and nitrate as the electron acceptor, as listed in Table 2. The mixture was made anaerobic by placing it into a plastic chamber containing ascorbate oxygen scrubbing system (Becton, Dickinson Co, Sparks, Md.). The nutrient solution formulation used in the assay contained either acetate or lactate as the sole carbon source and nitrate as the electron acceptor as shown in Table 2.

High salt injection water from Well #2 (67 ppt) was filter-sterilized and the following additional nutrients were added to it: 0.5 g/L NH$_4$Cl; 0.69 g/L NaH$_2$PO$_4$; 1.4 g/L KH$_2$PO$_4$; vitamins and trace metals as in Table 1. Sodium nitrate and either sodium acetate or sodium lactate were added to test samples to give the available donor/acceptor electron ratios shown in the e-column of Table 2. 25 mL of the above nutrient solution formulation and 1.0 mL of overnight grown microorganisms (prepared as described in example 1) were added to each glass filter holder. After 1 week incubation in an incubator/shaker at 28° C. and 100 rpm in anaerobic boxes, filters were removed and tested for plugging as described in General Methods. Each filter was measured 3 times. Results of flow times for each test sample are given in Table 2.

TABLE 2

Carbon sources added to the nutrient solution formulation for Pseudomonas stutzeri strain BR5311 for biofilm formation and related flow times

| Test | Sodium acetate | Sodium nitrate | Sodium lactate | e- | Water flow, sec |
|---|---|---|---|---|---|
| #1 | 1 g/L | 2.66 g/L |  | 1:2 | 16.7 +/− 3.5 |
| #2 |  | 2.66 g/L | 0.66 g/L | 1:2 | 8.7 +/− 1.0 |
| #3 | 2.07 g/L | 0.66 g/L |  | 4:1 | 17.7 +/− 2.8 |
| #4 |  | 0.66 g/L | 1.33 g/L | 4:1 | 11.7 +/− 2.0 |

As can be seen Table 2, significant plugging was observed when acetate was used as a carbon source (tests #1 and #3) regardless of carbon to nitrate ratio. Minimal plugging was observed in this high salt (67 ppt) medium of Well #2 waters with lactate with a donor/acceptor electron ratio of 4:1.

Example 3

Biofilm Formation in Low Salt with Acetate or Lactate with *Pseudomonas Stutzeri* BR5311

*Pseudomonas stutzeri* strain BR5311 was tested for its ability to form biofilms of sintered glass filters in low salt as described in General Methods. Strain BR5311 was grown overnight in Millers LB growth medium at 30° C. with shaking at 200 rpm. To initiate the experiment 1.0 mL of overnight grown microorganisms was added to 25 mL of the nutrient solution formulation described below in triplicate and added to a glass filter holder. These cultures were grown anaerobically in an incubator/shaker at 28° C./100 rpm for 2 weeks. In addition triplicate uninoculated controls with the same nutrient solution formulation, but without the strain inoculum, were performed in parallel with the inoculated test treatments.

Low salt nutrient solution formulation composition: NaCl, 10 g/L, NaHCO$_3$, 0.25 g/L, NaNO$_3$, 2 g/L, vitamin solution, 1 mL/L B12, 100 mg/L, p-aminobenzoic acid, 80 mg/L, D(+)-Biotin, 20 mg/L, nicotinic acid, 200 mg/L, Calcium pantothenate, 100 mg/L, pyridoxine hydrochloride, 300 mg/L thiamine-HCl.2H$_2$O, 200 mg/L, alpha-lipoic acid, 50 mg/L], selenite/tungstate solution, 1 mL/L [NaOH, 0.5 g/L, Na$_2$SeO$_3$.5H$_2$O, 6.0 mg/L, Na$_2$WO$_4$.2H$_2$O, 8.0 mg/L], SL-10 trace metals, 1 mL/L [25% HCl, 10 mL/L, FeCl$_2$.4H$_2$O, 1.5 g/L, ZnCl$_2$, 70 mg/L, MnCl$_2$.4H$_2$O, 100 mg/L, H$_3$BO$_3$, 6 mg/L, CoCl$_2$.6H$_2$O, 190 mg/L, CuCl$_2$.2H$_2$O, 2 mg/L, NiCl$_2$.6H$_2$O, 24 mg/L, Na$_2$MoO$_4$.2H$_2$O, 36 mg/L], KH$_2$PO$_4$, 0.02 g/L, NH$_4$Cl, 0.1 g/L, MgSO$_4$.7H$_2$O, 0.1 g/L, yeast extract 0.1 g/L.

The carbon source in the nutrient solution formulation was either sodium acetate or sodium lactate (at 1.0 g/L). The salinity was 20 ppt.

After two weeks, flow rates were checked as described in General Methods. Time for water passage was noted for each of the test and control filters and each filter was tested 3 times. Flow rates were calculated and post incubation values were compared to pre-incubation values for each filter. Results in Table 3 show that *Pseudomonas stutzeri* strain BR 5311 caused a significant decrease in flow rate versus the control treatments after two weeks of incubation. In both acetate and lactate control treatments the flow rates increased. The increased flow rate resulted from better water saturation of the filter pores after two weeks of submersed incubation. The test treatments containing the *Pseudomonas stutzeri* strain BR 5311 inoculum showed declines in flow rate. In the acetate test treatment, flow rate declined by about 42% and in the lactate test treatment flow rate declined about 27% in low salt conditions.

TABLE 3

Changes in flow rate through medium porosity glass filters after two week incubation

| | | flow, ml/sec | | | | | |
|---|---|---|---|---|---|---|---|
| | | post incubation Values* | | | | % change in flow | Mean % change in flow |
| Treatment | pre-incubation value | #1 | #2 | #3 | mean | rate[1] | rate |
| Acetate control 1 | 0.083 | 0.100 | 0.100 | 0.100 | 0.100 | +20 | +16 |
| Acetate control 2 | 0.091 | 0.125 | 0.111 | 0.111 | 0.116 | +27 | |
| Acetate control 3 | 0.091 | 0.091 | 0.091 | 0.091 | 0.091 | 0 | |
| Acetate test 1 | 0.100 | 0.067 | 0.067 | 0.067 | 0.067 | −33 | −42 |
| Acetate test 2 | 0.100 | 0.043 | 0.042 | 0.038 | 0.041 | −59 | |
| Acetate test 3 | 0.091 | 0.059 | 0.059 | 0.063 | 0.060 | −34 | |
| Lactate control 1 | 0.083 | 0.100 | 0.100 | 0.100 | 0.100 | +20 | +9 |
| Lactate control 2 | 0.091 | 0.100 | 0.091 | 0.100 | 0.097 | +7 | |
| Lactate control 3 | 0.083 | 0.083 | 0.083 | 0.083 | 0.083 | 0 | |
| Lactate test 1 | 0.111 | 0.125 | 0.111 | 0.111 | 0.116 | +4 | −27 |
| Lactate test 2 | 0.091 | 0.048 | 0.045 | 0.045 | 0.046 | −49 | |
| Lactate test 3 | 0.100 | 0.067 | 0.067 | 0.063 | 0.065 | −35 | |

*3 successive measurements/replicate.
[1] calculated as ((mean post incubation, ml/sec/preincubation, ml/sec)$^{-1}$) × 100

Example 4

Plugging Assay in High Salt with Acetate Using *Pseudomonas Stutzeri* Strain BR5311

*Pseudomonas stutzeri* strain BR5311 was assayed for its ability to form biofilms on sintered glass filters as described in General Methods using a high salt medium. Salinity of the nutrient solution formulation was 70 opt. Strain BR5311 was grown anaerobically in a nutrient solution formulation of the following composition; NaCl, 40.5 g/L, NH$_4$Cl, 0.1 g/L, KH$_2$PO$_4$, 0.02 g/L, Na$_2$SO$_4$, 0.1 g/L, selenite-tungstate solution [NaOH, 0.5 g/L, $Na_2SeO_3.5H_2O$, 6.0 mg/L, $Na_2WO_4.2H_2O$, 8.0 mg/L], 1 mL/L, $NaHCO_3$, 0.2 g/L, vitamin solution [Vitamin 812, 100 mg/L, p-aminobenzoic acid, 80 mg/L, D(+)-Biotin, 20 mg/L, Nicotinic acid, 200 mg/L, Calcium pantothenate, 100 mg/L, Pyridoxine hydrochloride, 300 mg/L, Thiamine-HCl.$2H_2O$, 200 mg/L, Alpha-lipoic acid, 50 mg/L], 1 mL/L, SL-10 trace metal solution [25% HCl, 10 mL/L, $FeCl_2.4H_2O$, 1.50 g/L, $ZnCl_2$, 70 mg/L, $MnCl_2.4H_2O$, 100 mg/L, $H_3BO_3$, 6 mg/L, $CoCl_2.6H_2O$, 190 mg/L, $CuCl_2.2H_2O$, 2 mg/L, $NiCl_2.6H_2O$, 24 mg/L, $Na_2MoO_4.2H_2O$, 36 mg/L], 1 mL/L, $CaCl_2.2H_2O$, 8.8 g/L, yeast extract, 0.025 g/L, $NaNO_3$, 2.4 g/L, Sodium acetate, 1.2 g/L, KCl, 0.86 g/L, $MgCl_2.6H_2O$, 6.4 g/L, Bromothymol blue solution, 0.4%, 3 mL.

The experiment and flow rate tests after 2 weeks of incubation were performed as described in Example 3. While the flow rate increased in the controls as in Example 3, strain BR5311 caused a significant decrease in flow rate (Table 4). The flow rates in the control treatments increased by an average of 20%. The test treatments containing the strain BR5311 inoculum showed a mean decline of 55% in flow rate underlining the ability of *Pseudomonas stutzeri* strain BR5311 to plug pores in a high slat nutrient solution formulation containing acetate.

TABLE 4

Changes in flow rate through medium porosity glass filters after two weeks incubation.

| treatment | pre incubation value | post incubation values* #1 | #2 | #3 | mean | % change in flow rate[1] | Mean % change in flow rate |
|---|---|---|---|---|---|---|---|
| control 1 | 0.083 | 0.091 | 0.091 | 0.091 | 0.091 | +10 | +20 |
| control 2 | 0.125 | 0.125 | 0.125 | 0.125 | 0.125 | 0 | |
| control 3 | 0.111 | 0.167 | 0.167 | 0.167 | 0.167 | +50 | |
| test 1 | 0.125 | 0.071 | 0.071 | 0.071 | 0.071 | −43 | −55 |
| test 2 | 0.083 | 0.048 | 0.048 | 0.048 | 0.048 | −42 | |
| test 3 | 0.083 | 0.015 | 0.016 | 0.017 | 0.016 | −81 | |

*3 successive measurements
[1]calculated as ((mean post incubation, mL/sec/preincubation, mL/sec)−1) × 100.

Example 5

Prophetic

Preparation of a Non Biofilm Forming Inoculum of *Pseudomonas Stutzeri* (Strain LH4:15) Using Lactate Biomass of *Pseudomonas stutzeri* (strain LH4:15), grown overnight, is prepared as described above. This biomass is then added to a 200 liter capacity fermentor to prepare larger amounts of biomass. Grown biomass is filtered and stored at −80° C. until required for use.

A 9,000 liter (L) capacity tank truck containing 6,000 L of a first nutrient solution formulation with lactate, is used containing: sodium chloride: 10,000 ppm; sodium lactate: 1,000 ppm; sodium Nitrate: 2,000 ppm; yeast extract: 100 ppm; ammonium chloride: 100 ppm; sodium dihydrogen phosphate: 20 ppm; pH (adjusted with NaOH or HCl as needed) to 6.5 to 7.0. The first nutrient solution formulation ingredients are mixed through circulating the contents of the tank. The truck can be parked in a heated garage while the contents of the tank, are circulating to assist in warming the tank to the desired temperature if needed.

A block of frozen stock of *Pseudomonas stutzeri* (strain LH4:15) is added to the tank. Circulation of the contents of the tank is continued to provide mixing of the first nutrient solution formulation around and over the frozen block to accelerate the thawing process. Completion of the thawing process is determined by either visual observation of the block, if it is floating, or by monitoring turbidity of the suspension at optical density ($OD_{600}$ nanometer, m). The suspension of *Pseudomonas stutzeri* (strain LH4:15) thus obtained is used either immediately or stored for a time.

The tank truck containing the suspension of the *Pseudomonas stutzeri* (strain LH4:15) in the first nutrient solution formulation is driven to the injection well. To inoculate the well, the tank is then connected either directly or through a filtration apparatus, designed to stop any large pieces of biomass from passing through (such as a biomass dispersing device described in US Patent Application Publication 20110244554), to a high pressure injection pump. The high pressure pump is then used to transfer the biomass from the tank truck to the injection well for deposition into the subterranean target site. The rate of injection is determined by the maximum allowable injection pressure into the reservoir. This injection pressure must remain below the fracture pressure of the rock strata containing the oil.

Example 6

Prophetic

Triggering Biofilm Formation by *Pseudomonas Stutzeri* (Strain LH4:15) Using Acetate Following injection of the biomass into the injection well as described in Example 5, the biomass is pushed deeper into the subterranean strata by injecting either water or the first nutrient solution formulation containing lactate as specified in Example 5. This step is followed by injection of 1,000 to 6,000 L of a second nutrient solution formulation containing 1,000 ppm acetate and including: sodium chloride: 10,000 ppm; sodium nitrate: 2,000 ppm; yeast extract: 100 ppm; ammonium chloride: 100 ppm; sodium dihydrogen phosphate: 20 ppm; pH (adjusted with NaOH or HCl as needed) to 6.5 to 7.0. When the added second nutrient solution formulation reaches the subterranean location where *Pseudomonas stutzeri* are deposited, the *Pseudomonas* cells start growing and consuming the acetate in the second nutrient solution formulation, and produce the biofilms and bioplugs in the pores of the subterranean target site thus altering the target site's permeability.

Example 7

Preparation of a Non Biofilm Forming Inoculum of *Pseudomonas Stutzeri* (Strain BR5311) Using Lactate Biomass of *Pseudomonas stutzeri* strain BR5311 (ATCC No. PTA-11283) was grown overnight and prepared as described above. This biomass was then added to a 200 liter capacity fermentor to prepare a larger amount of biomass. Grown biomass was filtered and concentrated by ~5× and stored at −80° C. until required for use.

A 9,000 liter (L) capacity tank truck containing 6,000 L of a nutrient solution formulation with lactate was prepared containing: sodium chloride: 10,000 ppm; sodium lactate:

1,000 ppm; sodium nitrate: 2,000 ppm; yeast extract: 100 ppm; ammonium chloride: 100 ppm; sodium dihydrogen phosphate: 20 ppm; pH (adjusted with NaOH or HCl as needed) 6.5 to 7.0. The ingredients were mixed by circulating the contents of the tank, producing a first nutrient solution formulation.

A block of frozen stock of *Pseudomonas stutzeri* strain BR5311 biomass was added to the tank. Circulation of the contents of the tank was continued to provide mixing of the first nutrient solution formulation around and over the frozen block to accelerate the thawing process. Completion of the thawing process was determined by either visual observation of the block, if it was floating, or by monitoring turbidity of the suspension by optical density ($OD_{600}$ nanometer, nm).

The tank truck containing the suspension of the *Pseudomonas stutzeri* BR5311 biomass in the first nutrient solution formulation was driven to the injection well. To inoculate the well, the tank was connected through a filtration apparatus designed to stop any large pieces of biomass from passing through, which is a biomass dispersing device described in US Patent Application Publication 20110244554, to a high pressure injection pump. The high pressure pump was then used to transfer the biomass from the tank truck to the injection well for deposition into the subterranean target site. The rate of injection was determined by the maximum allowable injection pressure into the reservoir. The injection pressure remained below the fracture pressure of the rock strata containing the oil while pumping the inoculum. In fact, no increase in injection pressure was observed while pumping the inoculum into the injector well indicating that the microbes did not form a biofilm at the face of the well bore.

Example 8

Triggering Biofilm Formation by *Pseudomonas Stutzeri* (Strain BR5311) Using Acetate Following injection of the biomass into the injection well as described in Example 7, the biomass was pushed deeper into the subterranean strata by pumping injection brine overnight into the injector well for 16 hours. This was followed by the injecting 6 cubic meters of the first nutrient solution formulation containing lactate as specified in Example 5. During pumping of the brine and the first nutrient solution there was no increase in the injection pressure indicating that the microbes had not formed any biofilms yet in the reservoir. The injector well was shut in for 5 days. Following this shut in 1,000 L of a second nutrient solution formulation was pumped into the injector well. This second nutrient solution contained: sodium acetate: 9 wt %; sodium nitrate: 18 wt %; yeast extract: 4500 ppm; ammonium chloride: 13500 ppm; sodium dihydrogen phosphate: 500 ppm. The addition of this second nutrient solution was repeated every other week for 6 months. At this time, the injection pressure of the well had increased 150 psi. No acetate or lactate was observed in the production water of the producer well that communicated with this injector. These results clearly showed that the *Pseudomonas stutzeri* cells were growing and consuming the acetate in the second nutrient solution formulation, and were producing biofilms and bioplugs in the pores of the subterranean target site thus altering the target site's permeability.

What is claimed is:

1. A method for treatment of a subterranean target site comprising the steps of, in order:
    a) preparing a biomass suspension comprising one or more species of microorganisms;
    b) introducing the suspension of (a) into an injection well bore of the subterranean target site;
    c) optionally introducing one or more fluids into the injection well bore;
    d) introducing a first nutrient solution formulation into the injection well bore wherein said first nutrient solution supports growth of one or more microorganisms of (a) at said subterranean target site but does not promote biomass aggregation and biofilm production; and
    e) introducing a second nutrient solution formulation into the injection well bore wherein said second nutrient solution formulation promotes bioplugging of pores and channels in the subterranean target site.

2. A method for treatment of a subterranean target site, comprising the steps of, in order:
    a) preparing a biomass suspension comprising one or more strains of *Pseudomonas stutzeri*;
    b) introducing the suspension of (a) into an injection well bore of the subterranean target site;
    c) optionally introducing one or more fluids into said injection well bore;
    d) introducing a first nutrient solution formulation into the injection well bore wherein said first nutrient solution comprises lactate and no acetate, and wherein the lactate promotes growth of the *Pseudomonas stutzeri* and maintains the *Pseudomonas stutzeri* in suspension; and
    e) introducing a second nutrient solution formulation into the injection well bore wherein said second nutrient solution comprises acetate, and wherein the acetate promotes bioplug formation by the *Pseudomonas stutzeri* strain of (a).

3. A method for treatment of a subterranean target site comprising the steps of, in order:
    a) preparing a biomass suspension comprising one or more species of microorganisms;
    b) introducing the suspension of (a) into an injection well bore of the subterranean target site;
    c) optionally introducing one or more fluids into the injection well bore;
    d) introducing a first nutrient solution formulation into the injection well bore wherein said first nutrient formulation comprises lactate and no acetate and wherein said first nutrient formulation supports growth of one or more microorganisms of (a) at said subterranean target site but does not promote biomass aggregation and biofilm production; and
    e) introducing a second nutrient solution formulation into the injection well bore wherein said second nutrient solution formulation promotes biopludging of pores and channels in the subterranean target site.

4. The method of claim 3 wherein step (c) is not optional and wherein one or more fluids of (c) assists moving the suspension of one or more microorganisms of (a) into the subterranean target site.

5. The method of claim 3 further comprising introducing one or more fluids into the injection well bore following step (d).

6. The method of claim 3 or 3 further comprising applying a shut-in period following step (d) or following introducing one or more fluids into the injection well bore after step (d).

7. The method of claim 6 wherein said one or more species of microorganisms is selected from the group consisting of *Pseudomonas stutzeri* BR5311 (ATCC No. PTA-11283) and *Pseudomonas stutzeri* LH4:15 (ATCC No. PTA-8823).

8. The method of claim 3 further comprising introducing one or more fluids into the injection well bore following step (e).

9. The method of claim 8 further comprising periodically introducing additional second nutrient solution formulation between introducing fluids.

10. The method of claim 3 wherein said one or more species of microorganisms is selected from a group consisting of *Pseudomonas, Bacillus, Actinomycetes, Acinetobacter, Arthrobacter, Arcobacter, Schizomycetes, Corynebacteria, Achromobacteria, Enterobacteria, Nocardia, Saccharomycetes, Schizosaccharomyces, Vibrio, Shewanella, Thauera, Petrotoga, Microbulbifer, Marinobacteria, Fusibacteria* and *Rhodotorula*.

11. The method of claim 3 wherein concentration of lactate in the first nutrient solution formulation is from about 25 parts per million to about 10,000 parts per million.

12. The method of claim 3 wherein the first and the second nutrient solution formulations comprise nitrate.

13. The method of claim 12 wherein concentration of nitrate is from about 20 parts per million to about 10,000 parts per million.

14. The method of claim 3 wherein the second nutrient solution formulation comprises acetate.

15. The method of claim 14 wherein the concentration of acetate in the second nutrient solution formulation is from about 100 parts per million to about 10,000 parts per million.

* * * * *